March 1, 1966 J. A. CAMPOLI 3,237,976
SPINDLE HARDWARE ASSEMBLY
Filed Aug. 12, 1963 2 Sheets-Sheet 1
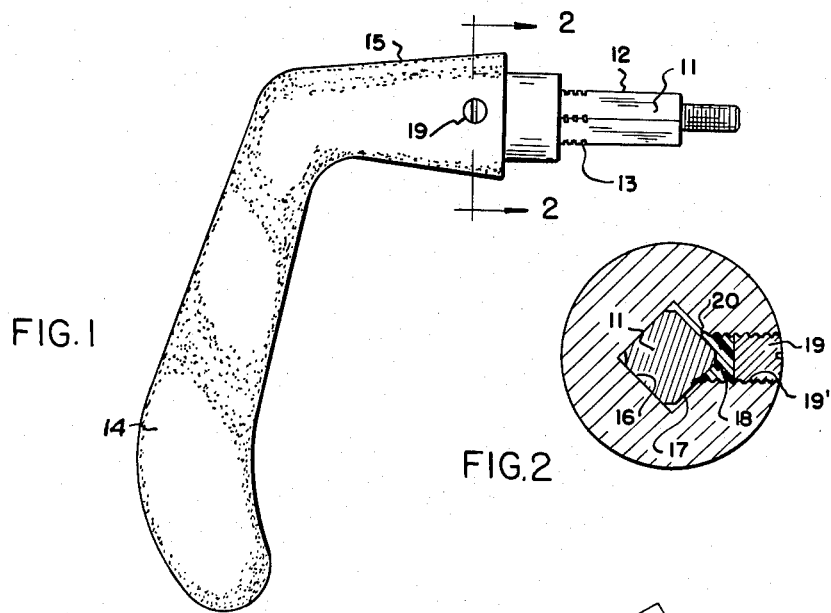
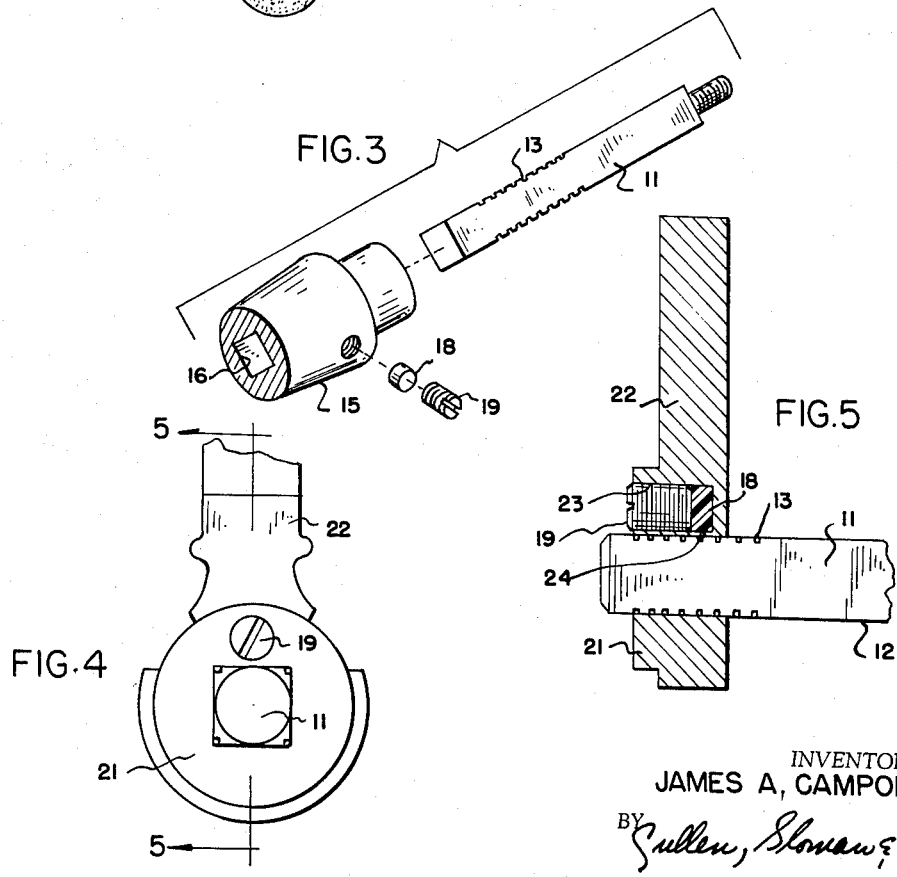
INVENTOR.
JAMES A. CAMPOLI
ATTORNEYS March 1, 1966  J. A. CAMPOLI  3,237,976
SPINDLE HARDWARE ASSEMBLY
Filed Aug. 12, 1963  2 Sheets-Sheet 2

INVENTOR.
JAMES A. CAMPOLI.
BY Cullen, Sloman & Cantor
ATTORNEYS.

United States Patent Office 3,237,976
Patented Mar. 1, 1966

3,237,976
SPINDLE HARDWARE ASSEMBLY
James A. Campoli, Oakville, Ontario, Canada, assignor to General Lock, Inc., Pontiac, Mich., a corporation of Michigan
Filed Aug. 12, 1963, Ser. No. 301,409
1 Claim. (Cl. 287—52.08)

The present invention relates to spindles of polygonal cross sectional shape and means for mounting a hardware member thereover in interlocked relationship.

Heretofore, in combinations of this sort a radially extending set screw has been employed which is threaded through one member and which frictionally and operatively engages the other member. Oftentimes the set screws loosen with continued use and with vibration so that the tightness of the fit and the interlock between the hardware member and the spindle is destroyed and eventually become ineffective or the hardware member becomes disengaged from the spindle.

Heretofore, often in mounting the spindle within a hardware member there has been required the threading of the spindle and corresponding threading of the aperture of the hardware member. It is one of the objects of the present invention to eliminate threaded spindles and such hardware and also to eliminate the disadvantage of the conventional screw arrangement.

It is another object to employ in conjunction with the hardware member and the spindle an intermediate member in the form of a resilient means preferably of nylon which is nested and secured within one of the assembled members and which is of such dimension as to compressively and frictionally interlock with the other member to establish a tight and firm relationship between the two members and for securing the same together.

It is another object to employ the intermediary of a set screw within the hardware member adapted to operatively and compressively engage the resilient means, nylon plug or pellet to transmit expansive frictional and retaining forces through the resilient means to the spindle for effecting a secure interlock between the two members.

Another object is to utilize the resiliency characteristic of nylon or similar material such that firm and effective forces are exerted axially upon the set screw by the nylon plug preventing loosening or unthreading thereofq.

It is another object to provide a lever handle, a door knob, a pulley or other hardware member mountable upon a spindle, preferably of polygonal cross sectional shape, wherein the member has a similarly shaped aperture receiving the spindle, a bore within the hardware receiving a hard partly resilient plastic preferably nylon pellet, and a set screw which acts against said pellet for exerting compressive retaining and frictional holding forces relative to the spindle for securing said member upon the spindle.

There are many adaptations where hardware members are apertured for mounting over polygonal spindles, several of which have been mentioned above merely by way of illustration and not by limitation.

The present invention furthermore utilizes the principle that when forces are transmitted to a confined body, these forces are transmitted in all directions. Accordingly, compressive forces may be exerted upon the nylon pellet in one direction by the threaded set screw and these forces may be transmitted in other directions to establish a frictional securing interlock between the hardware member and the spindle.

It is a further object to provide a reliable device for fastening knobs, handles or pulleys and the like to spindles.

It is another object to provide flexibility in locating, removing and replacing such knobs, pulleys, handles or other hardware upon spindles.

It is another object to provide a fastening means which will not deform the spindle or hardware device mounted thereon.

It is another object to provide an interlocking means between the hardware member and the spindle to provide an apparent tightness which greatly contributes to the apparent quality of the hardware.

These and other objects will be seen from the following specification and claim in conjunction with the appended drawings in which:

FIG. 1 is a side elevational view of a lever type handle secured upon a spindle.

FIG. 2 is a fragmentary section on an increased scale taken in the direction of lines 2—2 of FIG. 1.

FIG. 3 is an exploded view of the assembly in FIG. 1.

FIG. 4 is a front elevational fragmentary view of a different form of mounting of a hardware member upon a spindle.

FIG. 5 is a section taken in the direction of lines 5—5 of FIG. 4.

Figure 6:
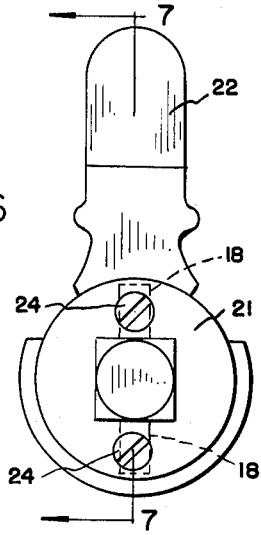
FIG. 6 is a front elevational view of another form of mounting the hardware member.

It will be understood that the above drawings illustrate merely a preferred embodiment of the invention, and that other embodiments are contemplated within the scope of the claim hereafter set forth.

Referring to FIGS. 1, 2 and 3 of the drawings there is shown a conventional spindle 11, polygonal in cross sectional shape, having four sides for illustration, defining edges 12 with a series of longitudinally spaced indentations 13 formed therein.

In the illustrative embodiment the hardware member is in the form of a lever handle 14 having at one end a body 15 with axial aperture 16 of a cross sectional shape similar to that of spindle 11 adapted to cooperatively yet loosely receive said spindle, as at 17. Radially extending threaded bore 19' is formed through body 15 and communicates with aperture 16.

A resilient pellet 18, preferably of nylon or other plastic material having characteristics similar to nylon, is shaped similarly to bore 19' and projected thereinto and extends into the small openings 17, FIG. 2, in engagement with spindle 11. Set screw 19 is threaded into bore 19' and into operative compressive engagement with pellet 18 forcing and holding the same firmly into interlocked frictional retaining engagement with said spindle.

On tightening of set screw 19 portions of nylon pellet 18 axially flow into spindle indentations 13 to provide a firm interlock. Under the compressive forces of the set screw the nylon pellet has the characteristic of partly flowing into the intervening space as at 20, to complete a tight interlock between body 15 and spindle 11. Due to the inherent resilient characteristic of the nylon plug 18 simultaneously there is exerted upon the set screw a similar high frictional pressure retaining the same against loosening.

Referring to FIGS. 4 and 5, spindle 11 projects through a similarly shaped aperture in body 21 of hardware member 22. Within body 21 there is provided a threaded bore 23 arranged closely adjacent said aperture. This provides a thin wall 24 in the hardware member, FIG. 5. Nylon pellet 18 is nested at the bottom of bore 23. Set screw 19 is threaded into bore 23 in operative compressive engagement with said pellet. While the pellet does not engage the spindle the compressive forces transmitted to the pellet are directed in all directions, including transversely, through wall 24 to exert a frictional operative holding pressure with respect to spindle 11, firmly securing hardware element 22 thereon. Member 21–22 may be in the nature of an operating device within a conventional lock mounted on spindle 11.

Figure 7:
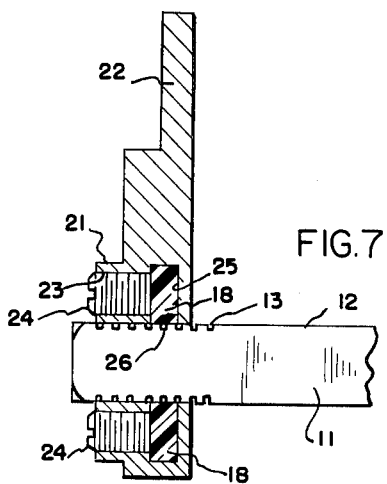
FIG. 7 is a section taken in the direction of lines 7—7 of FIG. 6.

A variation is shown in FIGS. 6 and 7 wherein hardware member 22 has a body 21 with an aperture therethrough corresponding in shape to the cross sectional shape of spindle 11.

Said body has one or more bores 23 which extend therein parallel to its aperture, which bore terminates in transversely extending socket 25 within which is nested an elongated nylon pellet 18 in engagement with spindle 11.

Set screw 24 is threaded into bore 23 and frictionally and operatively and compressively engages said pellet. The compressive forces transmitted to the pellet are transmitted in a right angular direction into and against spindle 11 for operative retaining and securing engagement therewith, FIG. 7. Portions of pellet 18 flow so as to interlock as at 26 within indentations 13 increasing the interlocking relationship between hardware member 22 and the spindle. FIG. 7 shows the use of two set screws and two pellets.

Figure 9:
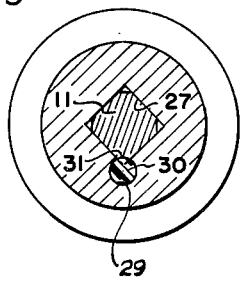
FIG. 9 is a section taken in the direction of lines 9—9 of FIG. 8.
Figure 8:
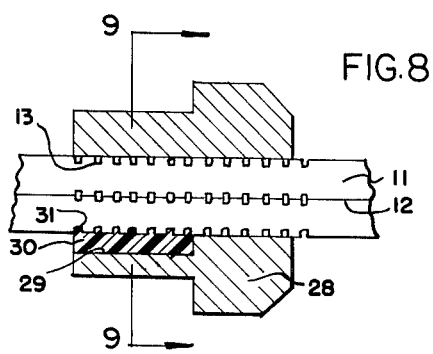
FIG. 8 is an elevational section of a slightly different form of interlocking assembly between the hardware member and spindle.

Very often it is desirable in mounting a hardware member upon a spindle that there may be an apparent rigidity or tightness which adds to the quality of the assembly. Illustrations of this are found in FIGS. 8, 9, 10 and 11. In FIGS. 8 and 9 the hardware element 28 has an aperture 27 therethrough receiving spindle 11. Elongated undercut bore 29 is formed in the body of hardware element 28, FIG. 8. Positioned, nested and secured within the bore 29 is an elongated pellet 30 of nylon or other resilient plastic material. Pellet 30 is oversize with respect to bore 29 and partly projects into aperture 27 within hardware element 28. Upon interlocking assembly of said hardware and spindle 11 there is a deformation or compressive interlock provided between the nylon insert 30 and said spindle firmly interconnecting the two parts.

The spindle has along its edges a series of indentations 13. Under the high compressive forces of assembling the spindle with respect to the oversize nylon insert 30 the nylon actually flows into the indentations as at 31 to provide a firm interlock and to provide an apparent tightness between the two members which contributes to the apparent quality of the assembly.

Figure 11:
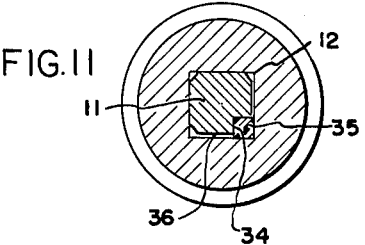
FIG. 11 is a section taken in the direction of lines 11—11 of FIG. 10.
Figure 10:
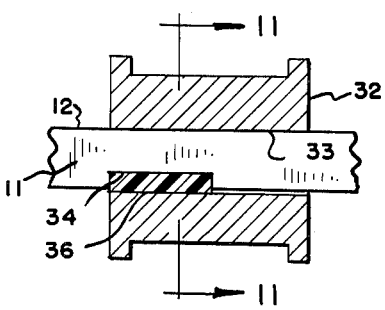
FIG. 10 is an elevational section showing a pulley secured upon a spindle.

The reverse of this construction is shown in FIGS. 10 and 11 wherein a pulley 32, for illustration, has an aperture 33 therethrough of a polygonal shape in cross section corresponding to spindle 11. An elongated undercut slot 34 is formed in spindle 11 within which is nested and secured an elongated strip or pellet 35 of nylon. Said pellet is oversize with respect to aperture 34 and projects outwardly thereof beyond the surface of the spindle as at 36, and upon assembly of the two parts is compressively and frictionally interlocked with the pulley and provides a tightness between the two parts.

The invention is primarily directed to a means of establishing a tight interlock between a spindle of polygonal cross sectional shape and a handle, lever, knob, pulley or other element. This interlock is achieved by the use of a hard yet resilient pellet or insert preferably of nylon, plastic, or the like and which has such characteristics of flow and resiliency as to provide, either alone or in cooperation with a set screw, an interlock between the assembled parts for firmly securing the same. Where a set screw is used said nylon due to its expansive and flow characteristic also exerts equal forces axially upon the set screw retaining the same against accidental dislodgment.

Having described my invention reference should now be had to the following claim.

I claim:

In combination with a spindle of polygonal cross sectional shape;
- a knob or handle having a similarly shaped oversized aperture mounted over and receiving said spindle;
- there being a series of indentations along the corner edges of the spindle;
- there being a threaded bore in the knob or handle radially of its aperture and communicating therewith in registry with a spindle corner edge;
- a pellet of resilient nylon material nested in said bore engaging a spindle corner edge;
- and a set screw threaded into said bore operatively and compressively engaging said pellet forcing and holding the same firmly in interlocked engagement with said spindle and indentations;
- said pellet flowing into said aperture and upon opposite sides of the spindle corner into the space defined by the oversized aperture providing a socket positively locking the spindle in said knob, said pellet having such resiliency as to exert constant holding forces upon the set screw preventing loosening thereof.

References Cited by the Examiner

UNITED STATES PATENTS

| | | | |
|---|---|---|---|
| 230,009 | 7/1880 | Harding | 151—24 |
| 251,988 | 1/1882 | Young | 292—350 |
| 951,836 | 3/1910 | Noack. | |
| 2,466,901 | 4/1949 | Krueger | 24—135 |
| 3,156,127 | 11/1964 | Pettigrew | 287—52.08 X |

JOSEPH D. SEERS, *Primary Examiner.*

M. HENSON WOOD, JR., *Examiner*